(12) United States Patent
Jacob et al.

(10) Patent No.: US 11,535,358 B2
(45) Date of Patent: Dec. 27, 2022

(54) LIGHTNING STRIKE PROTECTION FOR AN AIRCRAFT WINDSHIELD WIPER SYSTEM

(71) Applicant: Rosemount Aerospace Inc., Burnsville, MN (US)

(72) Inventors: Robin Jacob, Bangalore (IN); Aruna Kumar Huluvangala Krishnappa, Karnataka (IN); Guru Prasad Mahapatra, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 132 days.

(21) Appl. No.: 17/214,131

(22) Filed: Mar. 26, 2021

(65) Prior Publication Data

US 2021/0403138 A1 Dec. 30, 2021

(30) Foreign Application Priority Data

Jun. 25, 2020 (IN) .............................. 202041027014

(51) Int. Cl.
  *B64C 1/14* (2006.01)
  *B60S 1/34* (2006.01)
  *B64D 45/02* (2006.01)

(52) U.S. Cl.
  CPC .......... *B64C 1/1476* (2013.01); *B60S 1/3425* (2013.01); *B60S 1/3429* (2013.01); *B60S 1/3431* (2013.01); *B60S 1/3447* (2013.01); *B64C 1/14* (2013.01); *B64D 45/02* (2013.01); *B60S 1/34* (2013.01)

(58) Field of Classification Search
  CPC ........ B60S 1/34; B60S 1/3447; B60S 1/3425; B60S 1/3429; B60S 1/3431; B60S 1/3436; B60S 1/3434; B64C 1/1476; B64C 1/14; B64D 45/02
  USPC ...................................... 15/250.351, 250.352
  See application file for complete search history.

(56) References Cited

U.S. PATENT DOCUMENTS

| 4,755,904 A | 7/1988 | Brick |
| 4,852,204 A * | 8/1989 | Wilson ...................... B60S 1/38 15/250.07 |
| 5,863,181 A | 1/1999 | Bost et al. |
| 8,709,189 B2 | 4/2014 | Schaaf et al. |

(Continued)

FOREIGN PATENT DOCUMENTS

| DE | 102010039527 A1 | 2/2012 |
| EP | 0207825 A1 | 1/1987 |
| EP | 0248122 A2 | 12/1987 |

(Continued)

OTHER PUBLICATIONS

Extended European Search Report for EP Application No. 21181847.1, dated Nov. 25, 2021, pp. 4.

*Primary Examiner* — Gary K. Graham
(74) *Attorney, Agent, or Firm* — Kinney & Lange, P. A.

(57) ABSTRACT

An aircraft windshield wiper system includes a wiper arm, a wiper blade coupled to a distal end of the wiper arm, and a drive shaft coupled to a proximal end of the wiper arm. The wiper blade is configured to clean water, dirt, and other debris from the windshield of the aircraft. The drive shaft is configured to rotate and cause the wiper arm with the coupled wiper blade to sweep across the windshield. The wiper arm includes both composite and metal components to reduce the weight of the windshield wiper system while also providing lightning strike protection.

20 Claims, 4 Drawing Sheets

(56) References Cited

U.S. PATENT DOCUMENTS

2002/0020034 A1\* 2/2002 Choi ...................... B60S 1/34
15/250.352

FOREIGN PATENT DOCUMENTS

| | | |
|---|---|---|
| EP | 2868538 A1 | 5/2015 |
| FR | 2887833 A1 | 1/2007 |
| WO | 99/03713 \* | 1/1999 |

\* cited by examiner

LIGHTNING STRIKE PROTECTION FOR AN AIRCRAFT WINDSHIELD WIPER SYSTEM

CROSS-REFERENCE TO RELATED APPLICATION(S)

This application claims the benefit of Indian Provisional Application No. 202041027014 filed Jun. 25, 2020 for "LIGHTNING STRIKE PROTECTION FOR AN AIRCRAFT WINDSHIELD WIPER SYSTEM" by R. Jacob, A. K. H. Krishnappa and G. P. Mahapatra.

BACKGROUND

The present disclosure relates to windshield wiper systems used on an aircraft, and in particular to a windshield wiper system with lightning strike protection.

The aerospace industry is continually striving for increased aircraft efficiency, due to increased fuel and operating costs. As such, there is an increased focus on weight reduction throughout aircraft to achieve the desired increase in aircraft efficiency. One approach to reducing the overall weight of an aircraft is to use composite materials in place of the traditional aluminum alloys or other metallic materials. This is due to composite materials having improved structural performance, sufficient strength and stiffness characteristics, and a reduction in weight as compared to metallic materials. A drawback of composite materials is that they are less conductive than metallic materials and thus many do not meet Federal Aviation Administration (FAA) lightning strike requirements because they cannot dissipate the current and heat associated with a lightning strike as well as metallic materials.

Aircraft windshield wiper systems are used to wipe and clean water or other debris from an aircraft windshield, allowing better visibility out the windshield for both the pilot and co-pilot. Typical windshield wiper systems include components positioned within the aircraft such as a motor, motor converter, electronic control unit, and other components configured to drive motion of the windshield wiper system. Further, windshield wiper systems include components positioned outside the aircraft such as a wiper arm and a wiper blade. Previous wiper arms are constructed using a metal to meet the required strength characteristics as well as the FAA lightning strike requirements. The metal wiper arms have acceptable electrical resistance characteristics, providing an electric current flow path to an aircraft grounding surface where the energy surge due to the lightning strike is dissipated. Due to an increased focus on aircraft efficiency and weight reduction, lower mass wiper arms are desired with acceptable strength and lightning strike protection characteristics.

SUMMARY

In one example, a windshield wiper system is used on a windshield of an aircraft. The windshield wiper system includes a wiper arm and a wiper blade. The wiper arm includes a composite shaft with a metal layer adjacent to and surrounding an outer layer of the composite shaft and extending between a proximal end and a distal end of the composite shaft. The wiper arm also includes a metallic channel coupled to the proximal end of the composite shaft and electrically connected to the metal layer and a metallic shaft coupled to the distal end of the composite shaft and electrically connected to the metal layer. The wiper blade includes a wiper blade coupling attached to the metallic shaft of the wiper arm.

DETAILED DESCRIPTION

Figure 1A:
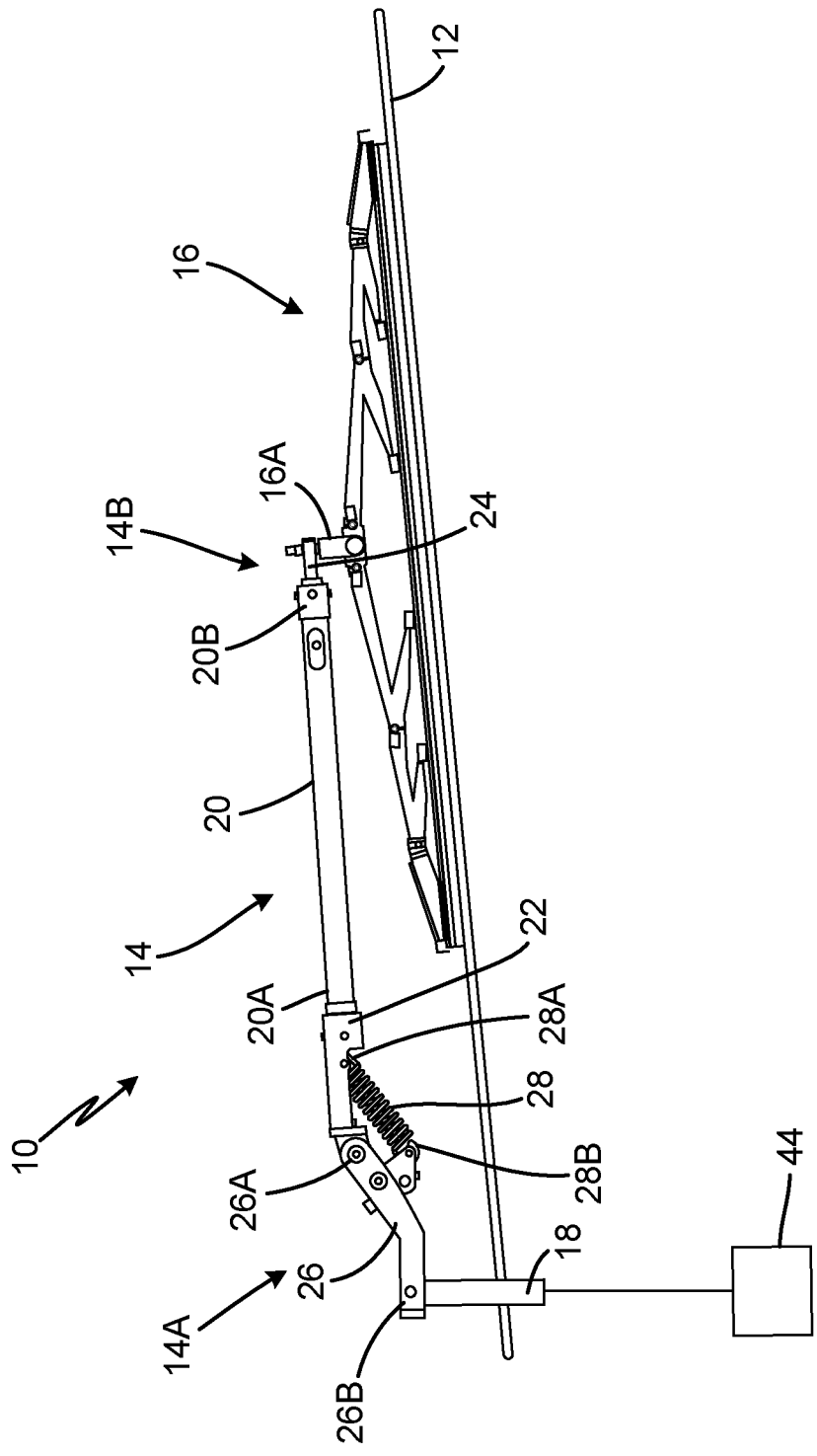
FIG. 1A is a side view of a windshield wiper system positioned on an aircraft windshield.
Figure 1B:
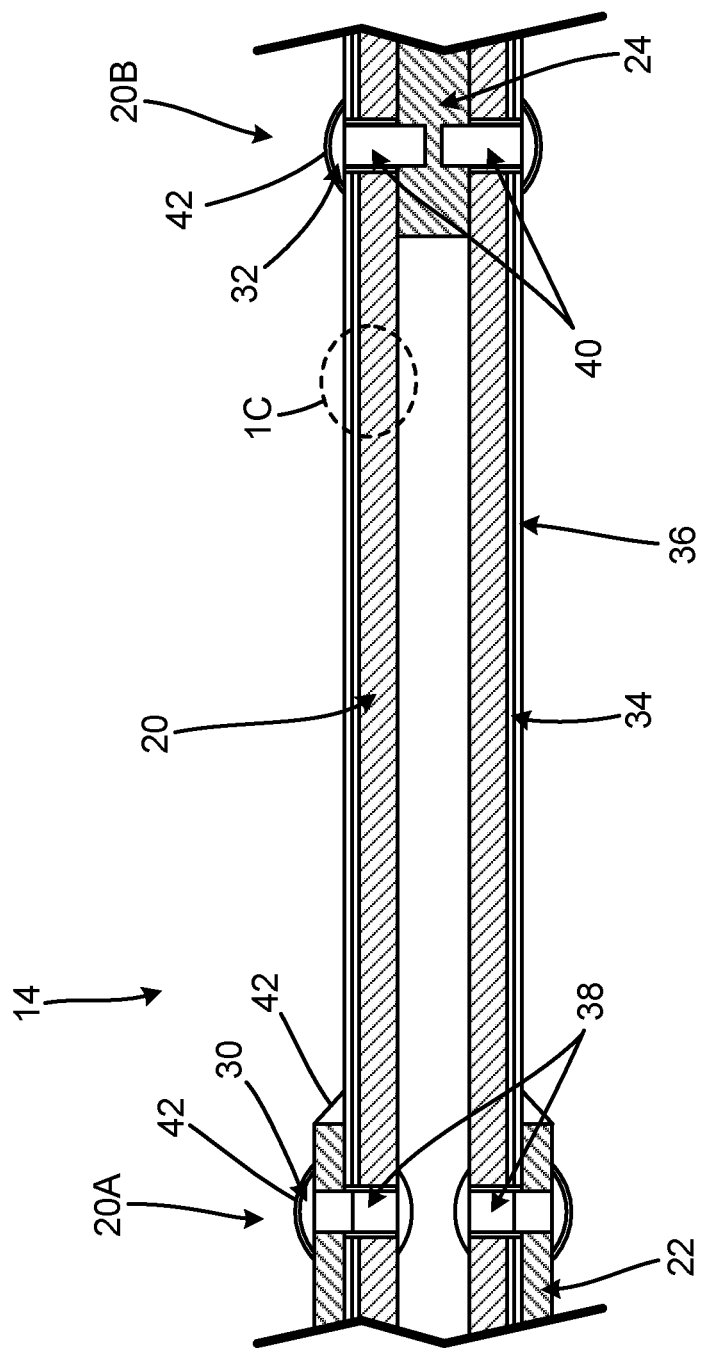
FIG. 1B is a cross-sectional view of a portion of the wiper arm of the aircraft windshield wiper system.
Figure 1C:
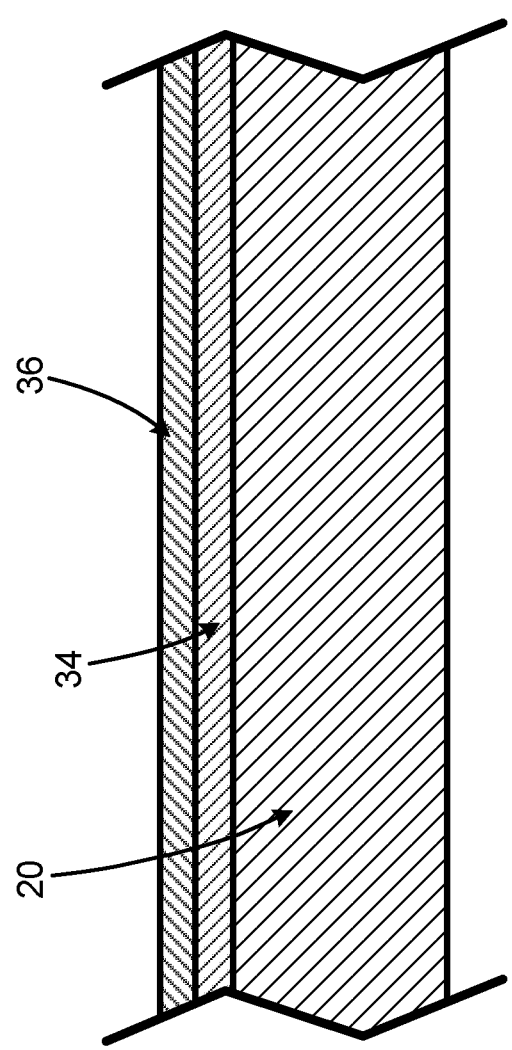
FIG. 1C is a close-up section view of a portion of the composite shaft of the wiper arm.
Figure 1D:
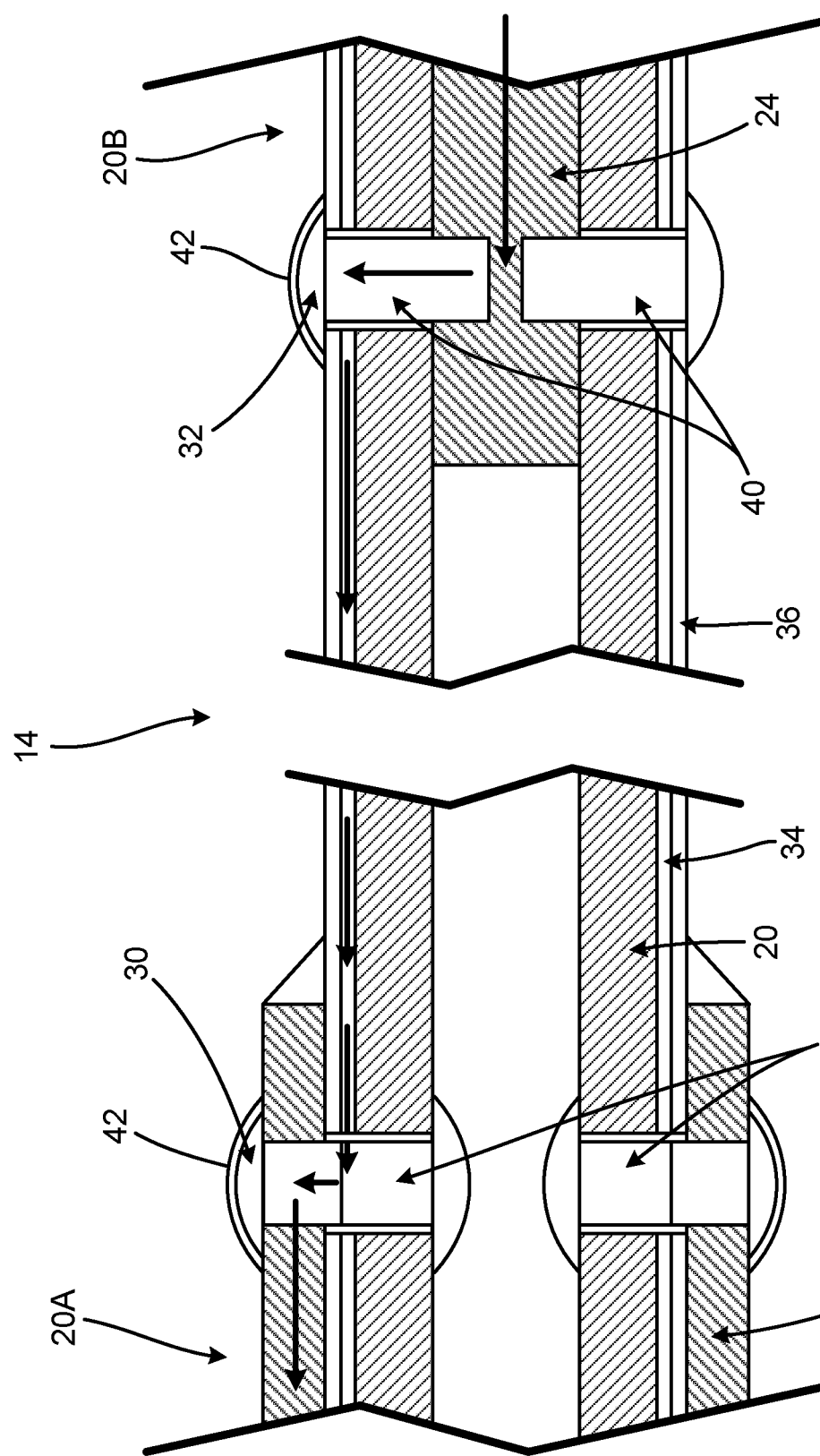
FIG. 1D is a close-up cross-sectional view of the wiper arm of FIG. 1B with break lines.

FIG. 1A is a side view of windshield wiper system (WWS) 10 positioned on aircraft windshield 12. FIG. 1B is a cross-sectional view of a portion of wiper arm 14 from WWS 10. FIG. 1C is a close-up section view of a portion of wiper arm 14. FIG. 1D is a close-up cross-sectional view of wiper arm 14 including break lines for clarity. FIGS. 1A-1D will be discussed together. WWS 10 includes wiper arm 14, wiper blade 16, and drive shaft 18. WWS 10 is installed on an aircraft with wiper arm 14, wiper blade 16, and drive shaft 18 interfacing with aircraft windshield 12. WWS 10 is configured to clear rain and other debris from aircraft windshield 12, providing better visibility for both the pilot and co-pilot of the aircraft.

WWS 10 includes wiper arm 14 including proximal end 14A and distal end 14B, wiper blade 16 including wiper blade coupling 16A, and drive shaft 18. Wiper arm 14 further includes composite shaft 20 including proximal end 20A and distal end 20B, metallic channel 22, metallic shaft 24, pivot arm 26 including first end 26A and second end 26B, spring 28 including first end 28A and second end 28B, a plurality of first fasteners 30, a plurality of second fasteners 32, metal layer 34, epoxy layer 36, a plurality of first bushings 38, a plurality of second bushings 40, and sealant 42. WWS 10 further includes electrical ground 44 positioned within the aircraft.

Wiper blade 16 includes wiper blade coupling 16A attached to distal end 14B of wiper arm 14. More specifically, wiper blade coupling 16A is attached to metallic shaft 24 and secures wiper blade 16 to wiper arm 14, such that wiper blade 16 traverses across aircraft windshield 12 with wiper arm 14. Drive shaft 18 is coupled to proximal end 14A of wiper arm 14 and drive shaft 18 is configured to rotate and cause wiper arm 14 with the coupled wiper blade 16 to sweep across aircraft windshield 12. More specifically, drive shaft 18 is coupled to second end 26B of pivot arm 26 and drive shaft 18 is configured to provide rotational energy to pivot arm 26, causing wiper arm 14 with the coupled wiper blade 16 to sweep across aircraft windshield 12. Spring 28 includes first end 28A coupled to metallic channel 22 and second end 28B coupled to pivot arm 26.

Metallic channel 22 is coupled to proximal end 20A of composite shaft 20 at one end and coupled to first end 26A of pivot arm 26 at the other end. As best shown in FIG. 1B, metallic channel 22 is positioned outside of and surrounds at least a portion of proximal end 20A of composite shaft 20. Metallic channel 22 is coupled to an outer surface or outer layer of composite shaft 20 using a plurality of first fasteners 30. The plurality of first fasteners 30 can be chosen from one or more of a screw, a bolt, a rivet, an adhesive, or an anchor. In an embodiment in which the plurality of first fasteners 30 are a screw, bolt, rivet, or anchor, the plurality of first fasteners 30 can be constructed from a steel or other metallic material. The plurality of first fasteners 30 are configured to secure metallic channel 22 to composite shaft 20 throughout operation of WWS 10. In the embodiment shown, metallic channel 22 is constructed from a steel but in another embodiment metallic channel 22 can be constructed from a different metallic material.

Metallic shaft 24 is coupled to distal end 20B of composite shaft 20 at one end and coupled to wiper blade coupling 16A at the other end. As best shown in FIG. 1B, metallic shaft 24 is positioned within at least a portion of distal end 20B of composite shaft 20. Metallic shaft 24 is coupled to an inner surface of composite shaft 20 using a plurality of second fasteners 32. The plurality of second fasteners 32 can be chosen from one or more of a screw, a bolt, a rivet, an adhesive, or an anchor. In an embodiment in which the plurality of second fasteners 32 are a screw, bolt, rivet, or anchor, the plurality of second fasteners 32 can be constructed from a steel or other metallic material. The plurality of second fasteners 32 are configured to secure metallic shaft 24 to composite shaft 20 throughout operation of WWS 10. In the embodiment shown, metallic shaft 24 is constructed from a steel but in another embodiment metallic shaft 24 can be constructed from a different metallic material.

As best shown in FIGS. 1C and 1D, composite shaft 20 is surrounded and covered by metal layer 34 and epoxy layer 36. Metal layer 34 can be a metal mesh or metal foil that surrounds and covers composite shaft 20, discussed further below. Although it will be described only as metal layer 34, it is understood that a metal mesh or a metal foil is interchangeable with the metal layer 34 described. In the embodiment shown, composite shaft 20 is a carbon fiber reinforced polymer or a carbon fiber reinforced plastic with 8-10 layers making up the wall thickness of composite shaft 20. In another embodiment, composite shaft 20 can be any non-metallic composite material with strength, stiffness, and weight characteristic suitable for meeting aircraft wiper arm requirements and composite shaft 20 can include more than or less than 8-10 layers. Composite shaft 20 alone does not have suitable electrical conductivity properties to transfer or dissipate the electric surge due to a lightning strike without damage to composite shaft 20. As such, composite shaft 20 could melt, burn, or collapse due to the high electrical resistance of the material.

Metal layer 34 is positioned adjacent to the outer layer or outer surface of composite shaft 20 and metal layer 34 fully surrounds the outer layer or outer surface of composite shaft 20. Metal layer 34 is a thin layer of metallic material with suitable electrical conductivity properties that allows metal layer 34 to transfer electrical current through wiper arm 14 upon a lightning strike to wiper arm 14. Metal layer 34 can be constructed from a variety of materials such as aluminum, copper, or bronze. Metal layer 34 fully surrounds composite shaft 20 and extends the length of composite shaft 20 from proximal end 20A to distal end 20B of composite shaft 20. Metal layer 34 is positioned between epoxy layer 36 and composite shaft 20. Epoxy layer 36 is positioned on the outer side or surface of metal layer 34 and epoxy layer 36 is configured to adhere and secure metal layer 34 to composite shaft 20. Epoxy layer 36 is also configured to provide environmental protection for both metal layer 34 and composite shaft 20, preventing corrosion or damage to the components.

Composite shaft 20 includes plurality of first bushings 38 embedded within the layers of composite shaft 20 adjacent proximal end 20A of composite shaft 20. In one embodiment, the plurality of first bushings 38 can include external threads in which the plurality of first bushings 38 are threaded into apertures within composite shaft 20. In another embodiment, the plurality of first bushings 38 do not include external threads in which the plurality of first bushings 38 are pressed and interference fit into an aperture within composite shaft 20. Additionally, the plurality of first bushings 38 can include internal threads for receiving a mating screw or bolt or the plurality of first bushings 38 can include a smooth internal surface for receiving rivets, anchors, or adhesives. The plurality of first bushings 38 are equally spaced about the circumference of composite shaft 20. In the embodiment shown, there are four first bushings 38. In another embodiment, there can be more than or less than four first bushings 38. The plurality of first bushings 38 can be constructed from a steel or other metallic material.

Composite shaft 20 includes plurality of second bushings 40 embedded within the layers of composite shaft 20 adjacent distal end 20B of composite shaft 20. In one embodiment, the plurality of second bushings 40 can include external threads in which the plurality of second bushings 40 are threaded into apertures within composite shaft 20. In another embodiment, the plurality of second bushings 40 do not include external threads in which the plurality of second bushings 40 are pressed and interference fit into an aperture within composite shaft 20. Additionally, the plurality of second bushings 40 can include internal threads for receiving a mating screw or bolt or the plurality of second bushings 40 can include a smooth internal surface for receiving rivets, anchors, or adhesives. The plurality of second bushings 40 are equally spaced about the circumference of composite shaft 20. In the embodiment shown there are four second bushings 40. In another embodiment, there can be more than or less than four second bushings 40. The plurality of second bushings 40 can be constructed from a steel or other metallic material.

The plurality of first bushings 38 and the plurality of second bushings 40 are configured to provide attachment points for the plurality of first fasteners 30 and the plurality of second fasteners 32, respectively. To secure metallic channel 22 to composite shaft 20, each of the plurality of first fasteners 30 extends through a corresponding aperture within metallic channel 22, each of the plurality of first fasteners 30 extends through a corresponding aperture within metal layer 34, and each of the plurality of first fasteners 30 extends through and are coupled to one of the plurality of first bushings 38. To secure metallic shaft 24 to composite shaft 20, each of the plurality of second fasteners 32 extends through a corresponding aperture within metal layer 34, each of the plurality of second fasteners 32 extends through one of the plurality of second bushings 40, and each of the plurality of second fasteners 32 extends to and abuts metallic shaft 24. The plurality of first bushings 38 and the plurality of second bushings 40 are also configured to provide metal-to-metal contact points between adjacent components of wiper arm 14 and thus an electrical current flow path through wiper arm 14, discussed further below.

The plurality of first bushings 38 and the plurality of second bushings 40 are secured within the layers of composite shaft 20 with a close fit or an interference fit to minimize the air gaps between composite shaft 20 and the plurality of first bushings 38 and the plurality of second bushings 40. The close fit or interference fit prevents arcing and creates the electrical current flow path through wiper arm 14. Further, the interface between the plurality of first bushings 38 and the plurality of first fasteners 30 is isolated from atmospheric exposure by epoxy layer 36, eliminating the risk of galvanic corrosion due to dissimilar metal contact. Likewise, the interface between the plurality of second bushings 40 and the plurality of second fasteners 32 is isolated from atmospheric exposure by epoxy layer 36, eliminating the risk of galvanic corrosion due to dissimilar metal contact. Additionally, sealant 42 can be used to cover the exposed heads of the plurality of first fasteners 30 and the plurality of second fasteners 32 to prevent ingress of corrosive agents to the interface between metal layer 34 and the plurality of first fasteners 30, the plurality of second fasteners 32, the plurality of first bushings 38, and the plurality of second bushings 40. Sealant 42 can also be applied to a corner interface between metallic channel 22 and composite shaft 20, preventing ingress of corrosive agents into wiper arm 14. Sealant 42 can be an epoxy or other sealant suitable for the environment exposed to wiper blade 16 under operating conditions of the aircraft.

As shown by the arrows in FIG. 1D, metal-to-metal contact between each respective component of wiper arm 14 creates an electric current flow path through wiper arm 14. The electric current flow path through wiper arm 14 allows wiper arm 14 to receive a lightning strike and dissipate or transfer the electrical current surge away from wiper arm 14 before wiper arm 14 is damaged due to the lightning strike. Metal-to-metal contact is present in WWS 10 from distal end 14B of wiper arm 14, through proximal end 14A of wiper arm 14, through pivot arm 26, and through drive shaft 18. More specifically, metal-to-metal contact is present between: metallic shaft 24 and the plurality of second fasteners 32; the plurality of second fasteners 32 and the plurality of second bushings 40; the plurality of second bushings 40 and metal layer 34; metal layer 34 and the plurality of first bushings 38; the plurality of first bushings 38 and the plurality of first fasteners 30; and the plurality of first fasteners 30 and metallic channel 22. Additionally, metal-to-metal contact is present between metallic channel 22 and pivot arm 26 and also between pivot arm 26 and drive shaft 18, in an embodiment in which pivot arm 26 and drive shaft 18 are constructed from a steel or other metallic material.

The metal-to-metal contact between each respective component creates an electric current flow path through wiper arm 14 from metallic shaft 24 through the plurality of second fasteners 32, the plurality of second bushings 40, the metal layer 34, the plurality of first bushings 38, the plurality of first fasteners 30, and metallic channel 22. Further, the electric current flow path through wiper arm 14 extends from metallic channel 22 through the metallic pivot arm 26 and then from the metallic pivot arm 26 through the metallic drive shaft 18 to electrical ground 44 positioned within the aircraft. Electrical ground 44 is configured to dissipate and discharge excess electricity within the aircraft before the excess electricity can damage the aircraft. The electric current flow path through wiper arm 14 allows wiper arm 14 to receive a lightning strike and discharge or dissipate the electric current within wiper arm 14 before damage occurs to wiper arm 14.

In operation, a lightning strike is likely to strike metallic shaft 24 because metallic shaft 24 protrudes the farthest outward from aircraft windshield 12 and wiper arm 14. The electric current from the lightning strike will flow through the electric current flow path described above until the electric current reaches electrical ground 44 onboard the aircraft, where the energy surge due to the lightning strike is dissipated. Composite shaft 20 and metal layer 34 of wiper arm 14 provide the benefit of increased strength, reduced weight, and prevention of wiper arm 14 damage due to a lightning strike. Further, wiper arm 14 meets the goals of reduced weight, increased aircraft efficiency, safe flight operation, and the FAA lightning strike requirements for wipers on an aircraft application. Wiper arm 14 provides the benefits listed above as well as many other benefits appreciated by a person skilled in the art. Composite shaft 20 and metal layer 34 are advantageous and preferable over traditional metal wiper blades.

Discussion of Possible Embodiments

The following are non-exclusive descriptions of possible embodiments of the present invention.

A windshield wiper system for use on a windshield of an aircraft, the windshield wiper system comprising: a wiper arm comprising: a composite shaft with a metal layer adjacent to and surrounding an outer layer of the composite shaft and extending between a proximal end and a distal end of the composite shaft; a metallic channel coupled to the proximal end of the composite shaft and electrically connected to the metal layer; and a metallic shaft coupled to the distal end of the composite shaft and electrically connected to the metal layer; and a wiper blade including a wiper blade coupling attached to the metallic shaft of the wiper arm.

The windshield wiper system of the preceding paragraph can optionally include, additionally and/or alternatively, any one or more of the following features, configurations and/or additional components:

A drive shaft is coupled to a proximal end of the wiper arm, wherein the drive shaft is configured to rotate and cause the wiper arm and the wiper blade to sweep in an arc.

The wiper arm further comprises: a pivot arm including a first end and a second end, wherein the first end of the pivot arm is coupled to the metallic channel and the second end of the pivot arm is coupled to the drive shaft; and a spring including a first end and a second end, wherein the first end of the spring is coupled to the metallic channel and the second end of the spring is coupled to the pivot arm; wherein the drive shaft provides rotational energy to the pivot arm, causing the wiper arm and the wiper blade to sweep in an arc.

The metallic channel is positioned outside of and surrounds at least a portion of the proximal end of the composite shaft, and wherein the metallic channel is coupled to the outer layer of the composite shaft.

The metallic shaft is positioned within at least a portion of the distal end of the composite shaft, and wherein the metallic shaft is coupled to an inner surface of the composite shaft.

A plurality of first bushings are embedded within the composite shaft adjacent the proximal end of the composite shaft, and wherein the plurality of first bushings are spaced about a circumference of the composite shaft.

A plurality of first fasteners extend through the metallic channel, the metal layer, and the plurality of first bushings to secure the metallic channel to the composite shaft.

A plurality of second bushings are embedded within the composite shaft adjacent the distal end of the composite shaft, and wherein the plurality of second bushings are spaced about the circumference of the composite shaft.

A plurality of second fasteners extend through the metal layer, through the plurality of second bushings, and to the metallic shaft to secure the metallic shaft to the composite shaft.

The plurality of first bushings, plurality of second bushings, plurality of first fasteners, and plurality of second fasteners are constructed from steel.

The plurality of first fasteners and the plurality of second fasteners comprise a screw, a bolt, a rivet, an adhesive, or an anchor.

Sealant is positioned adjacent the plurality of first fasteners, adjacent the plurality of second fasteners, and at a corner interface between the metallic channel and the composite shaft, and wherein the sealant is configured to prevent ingress of corrosive agents in the wiper arm.

Metal-to-metal contact is present between: the metallic shaft and the plurality of second fasteners; the plurality of second fasteners and the plurality of second bushings; the plurality of second bushings and the metal layer; the metal layer and the plurality of first bushings; the plurality of first bushings and the plurality of first fasteners; and the plurality of first fasteners and the metallic channel.

The metal-to-metal contact between each respective component creates an electric current flow path through the wiper arm from the metallic shaft through the plurality of second fasteners, the plurality of second bushings, the metal layer, the plurality of first bushings, the plurality of first fasteners, and the metallic channel.

The electric current flow path through the wiper arm extends from the metallic channel through a metallic pivot arm and through a metallic drive shaft.

The metal layer is a metal mesh or a metal foil.

An epoxy layer covers the metal layer surrounding the composite shaft, and wherein the metal layer is positioned between the epoxy layer and the composite shaft.

The composite shaft is constructed from a carbon fiber reinforced polymer or a carbon fiber reinforced plastic.

The metal layer is constructed from one of aluminum, copper, or bronze.

The metallic channel and the metallic shaft are constructed from a steel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for use on a windshield of an aircraft, the windshield wiper system comprising:
    a wiper arm comprising:
        a composite shaft with a metal layer adjacent to and surrounding an outer layer of the composite shaft and extending between a proximal end and a distal end of the composite shaft;
        a metallic channel coupled to the proximal end of the composite shaft and electrically connected to the metal layer; and
        a metallic shaft coupled to the distal end of the composite shaft and electrically connected to the metal layer; and
    a wiper blade including a wiper blade coupling attached to the metallic shaft of the wiper arm.

2. The windshield wiper system of claim 1 and further comprising a drive shaft coupled to a proximal end of the wiper arm, wherein the drive shaft is configured to rotate and cause the wiper arm and the wiper blade to sweep in an arc.

3. The windshield wiper system of claim 2, wherein the wiper arm further comprises:
    a pivot arm including a first end and a second end, wherein the first end of the pivot arm is coupled to the metallic channel and the second end of the pivot arm is coupled to the drive shaft; and
    a spring including a first end and a second end, wherein the first end of the spring is coupled to the metallic channel and the second end of the spring is coupled to the pivot arm;
    wherein the drive shaft provides rotational energy to the pivot arm, causing the wiper arm and the wiper blade to sweep in an arc.

4. The windshield wiper system of claim 1, wherein the metallic channel is positioned outside of and surrounds at least a portion of the proximal end of the composite shaft, and wherein the metallic channel is coupled to the outer layer of the composite shaft.

5. The windshield wiper system of claim 1, wherein the metallic shaft is positioned within at least a portion of the distal end of the composite shaft, and wherein the metallic shaft is coupled to an inner surface of the composite shaft.

6. The windshield wiper system of claim 1, wherein a plurality of first bushings are embedded within the composite shaft adjacent the proximal end of the composite shaft, and wherein the plurality of first bushings are spaced about a circumference of the composite shaft.

7. The windshield wiper system of claim 6, wherein a plurality of first fasteners extend through the metallic channel, the metal layer, and the plurality of first bushings to secure the metallic channel to the composite shaft.

8. The windshield wiper system of claim 6, wherein a plurality of second bushings are embedded within the composite shaft adjacent the distal end of the composite shaft, and wherein the plurality of second bushings are spaced about the circumference of the composite shaft.

9. The windshield wiper system of claim 8, wherein a plurality of second fasteners extend through the metal layer, through the plurality of second bushings, and to the metallic shaft to secure the metallic shaft to the composite shaft.

10. The windshield wiper system of claim 9, wherein the plurality of first bushings, plurality of second bushings, plurality of first fasteners, and plurality of second fasteners are constructed from steel.

11. The windshield wiper system of claim 9, wherein the plurality of first fasteners and the plurality of second fasteners comprise a screw, a bolt, a rivet, an adhesive, or an anchor.

12. The windshield wiper system of claim 9, wherein sealant is positioned adjacent the plurality of first fasteners, adjacent the plurality of second fasteners, and at a corner interface between the metallic channel and the composite shaft, and wherein the sealant is configured to prevent ingress of corrosive agents in the wiper arm.

13. The windshield wiper system of claim 9, wherein metal-to-metal contact is present between:
    the metallic shaft and the plurality of second fasteners;
    the plurality of second fasteners and the plurality of second bushings;
    the plurality of second bushings and the metal layer;
    the metal layer and the plurality of first bushings;
    the plurality of first bushings and the plurality of first fasteners; and
    the plurality of first fasteners and the metallic channel.

14. The windshield wiper system of claim 13, wherein the metal-to-metal contact between each respective component creates an electric current flow path through the wiper arm from the metallic shaft through the plurality of second fasteners, the plurality of second bushings, the metal layer, the plurality of first bushings, the plurality of first fasteners, and the metallic channel.

15. The windshield wiper system of claim 14, wherein the electric current flow path through the wiper arm extends from the metallic channel through a metallic pivot arm and through a metallic drive shaft.

16. The windshield wiper system of claim 1, wherein the metal layer is a metal mesh or a metal foil.

17. The windshield wiper system of claim 1, wherein an epoxy layer covers the metal layer surrounding the composite shaft, and wherein the metal layer is positioned between the epoxy layer and the composite shaft.

18. The windshield wiper system of claim 1, wherein the composite shaft is constructed from a carbon fiber reinforced polymer or a carbon fiber reinforced plastic.

19. The windshield wiper system of claim 1, wherein the metal layer is constructed from one of aluminum, copper, or bronze.

20. The windshield wiper system of claim 1, wherein the metallic channel and the metallic shaft are constructed from a steel.

\* \* \* \* \*